United States Patent [19]
Britt et al.

[11] 4,272,262
[45] Jun. 9, 1981

[54] GAS-SEPARATION FILTER DEVICE

[75] Inventors: Monroe Britt; Karl L. Westlin, both of Louisville, Ky.

[73] Assignee: American Air Filter Company, Inc., Louisville, Ky.

[21] Appl. No.: 79,564

[22] Filed: Sep. 27, 1979

[51] Int. Cl.³ .................................................. B01D 46/04
[52] U.S. Cl. ....................................... 55/302; 55/487; 55/484; 55/497; 55/521
[58] Field of Search ............... 55/96, 302, 487, 484, 55/497–499, 521; 210/333 R, 493

[56] References Cited

U.S. PATENT DOCUMENTS

| | | | |
|---|---|---|---|
| 2,013,038 | 9/1935 | Dollinger | 55/484 |
| 3,250,063 | 5/1966 | Andrews | 55/487 |
| 3,377,783 | 4/1968 | Young . | |
| 3,394,532 | 7/1968 | Oetiker . | |
| 3,470,680 | 10/1969 | Avera | 55/497 |
| 3,499,268 | 3/1970 | Pausch . | |
| 3,606,736 | 9/1971 | Leliaert et al. . | |
| 3,726,066 | 4/1973 | Colley et al. . | |
| 3,798,878 | 3/1974 | Pausch . | |
| 3,877,899 | 4/1975 | Bundy et al. . | |

FOREIGN PATENT DOCUMENTS

| | | | |
|---|---|---|---|
| 225059 | 10/1959 | Australia | 55/302 |
| 2528220 | 1/1976 | Fed. Rep. of Germany | 55/302 |
| 2722272 | 11/1978 | Fed. Rep. of Germany | 55/302 |
| 2730925 | 11/1979 | Fed. Rep. of Germany | 55/302 |
| 1260620 | 4/1961 | France | 55/302 |
| 602157 | 7/1978 | Switzerland | 55/497 |
| 1016556 | 1/1966 | United Kingdom | 55/302 |

OTHER PUBLICATIONS

Pulseflow-Western Precipitation Joy Mfg. Co., Catalog No. PF100, 8/69, pp. 1–4.

*Primary Examiner*—Bernard Nozick
*Attorney, Agent, or Firm*—Thomas G. Anderson; Jon C. Winger

[57] ABSTRACT

A filtering device for removing particulate matter from a gas stream includes a housing with its interior divided by a horizontal partition into an upper plenum chamber and a lower plenum chamber. Planar panel filters arranged in V-shaped banks are suspended from the horizontal partition in the lower plenum chamber. These banks of panel filters coact with the horizontal partition to form a cleaned gas compartment. The housing also has a dirty gas stream inlet to the lower plenum chamber and a clean gas outlet from the upper plenum chamber. A first venturi is located at the horizontal partition and provides a passage for a gas between the cleaned gas compartment and upper plenum chamber, and a second smaller converging nozzle located in the upper plenum chamber coaxially aligned with and spaced from the first venturi. A high energy cleaning gas emitting nozzle is spaced above the second venturi and aligned to direct a jet of high energy cleaning gas axially into the second converging nozzle.

8 Claims, 13 Drawing Figures

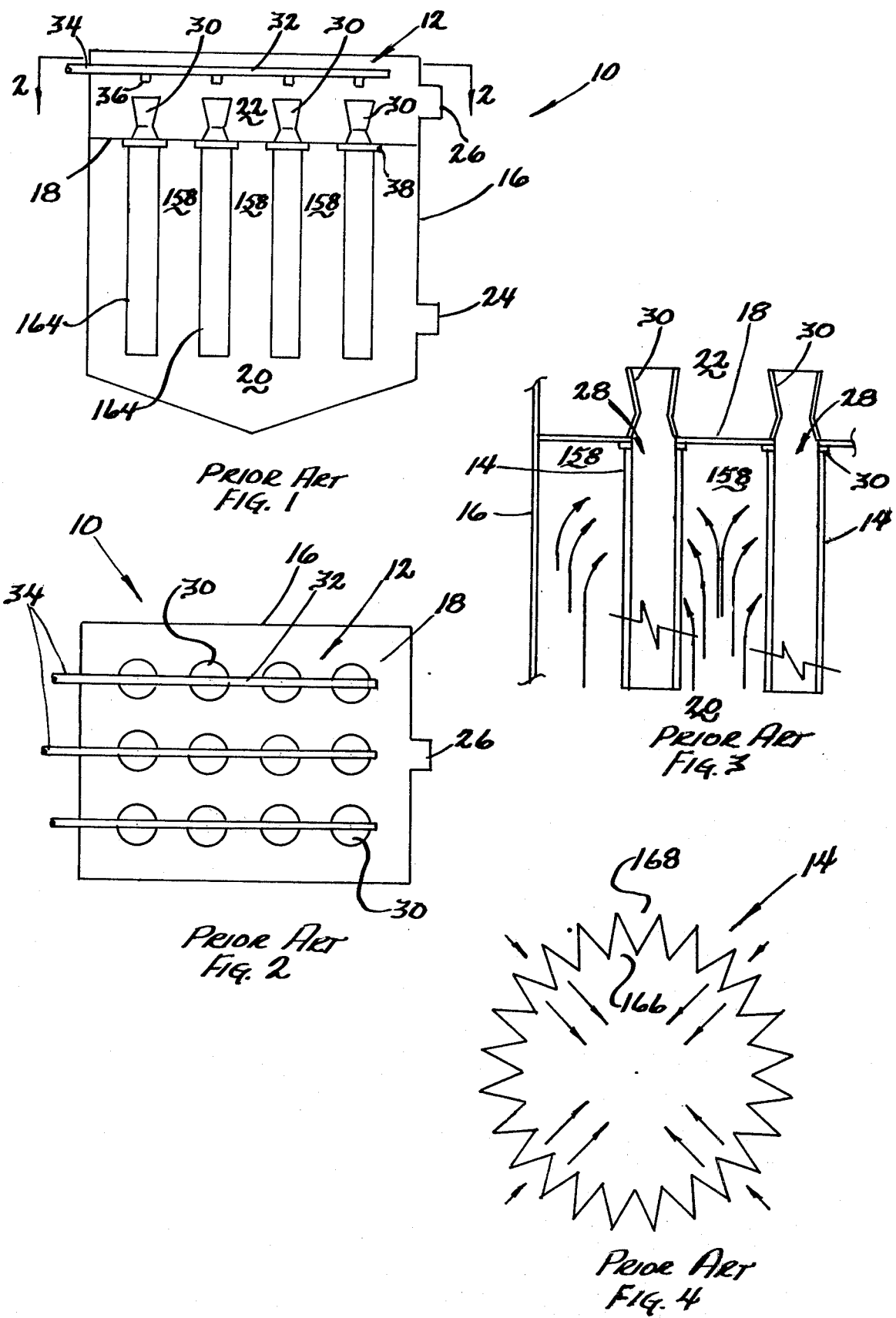

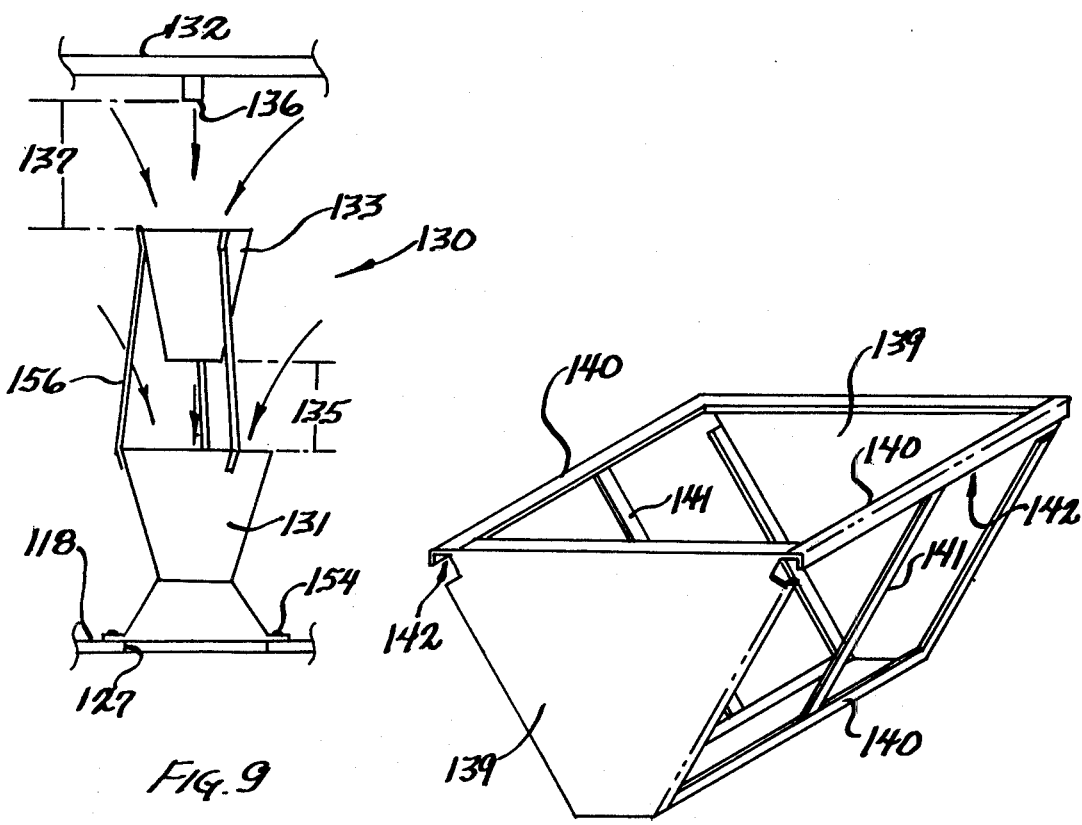
Fig. 9
Fig. 12
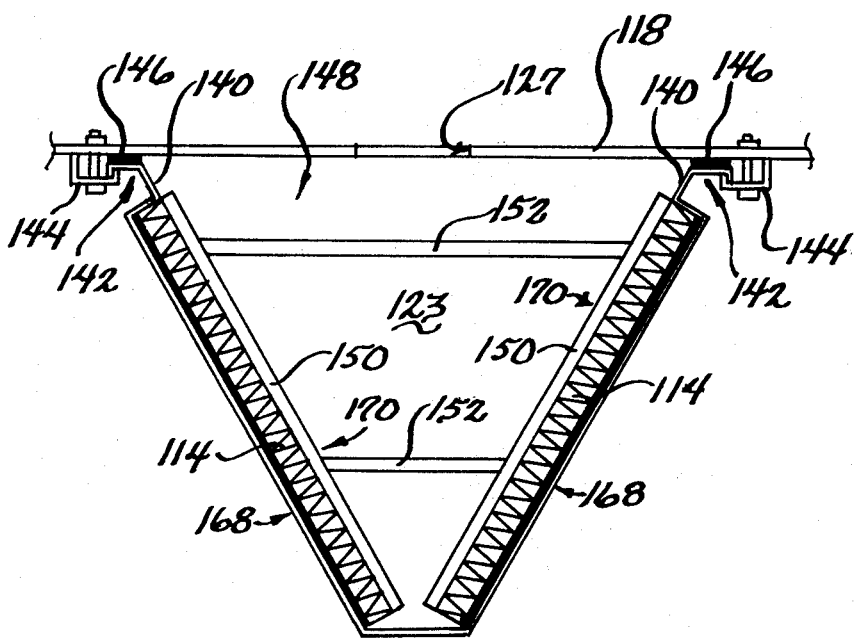
Fig. 13

GAS-SEPARATION FILTER DEVICE

BACKGROUND OF THE INVENTION

The invention relates to gas separation devices with gas contacting means and more particularly such devices with pneumatic reverse flushing means for media cleaning.

There are various gas separation devices employing pneumatic reverse flushing means for cleaning the gas separation media.

Examples of some such devices, commonly called bag houses employing filter bags as the gas contacting means, are shown in U.S. Pat. Nos. 3,394,532 issued on July 30, 1968 to H. Oetiker; 3,377,783 issued on Apr. 16, 1968 to H. T. Young; 3,499,268 issued on Mar. 10, 1970 to J. Paush; 3,606,736 issued on Sept. 21, 1971 to R. M. Leliaert et al; 3,798,878 issued on Aug. 18, 1972 to J. Pausch; 3,726,066 issued on Apr. 10, 1973 to D. G. Colley et al; 3,874,857 issued on Apr. 1, 1975 to D. H. Hunt et al; and 3,877,899 issued on Apr. 15, 1975 to R. P. Bondy et al.

Baghouse filter devices have worked well for many applications, but of course, they do not fulfill the need for efficient gas separation in all applications. For example, baghouse filter devices are particularly well suited for removing material from a gas stream where the material tends to pack together in a cake on the filter media or has an adhesive affinity for the filter media. This is because the caked material can be easily removed by shaking the bag filter or reverse flushing with high energy gas which distorts the bag and breaks up the caked material. Baghouse type devices are also suited for applications where the physical size of the housing is of no concern because they are typically very large due to the fact that the filter bag must themselves be large.

Another known filtering device similar in structure to the baghouse type includes a housing for enclosing filters, but uses pleated cylindrically shaped filters in place of the tubular bag filters. This type of device is cleaned by injecting a high stream energy gas stream into the filter in a direction counter to the flow of dirty gas to be cleaned. Because the cylindrical filter is rigid and, therefore, not really distortable, it is not particularly well suited for removing material from a gas stream which cakes together or has an adhesive affinity for the filter media. However, the pleated construction of the cylindrical filter increases the surface area of filter media which can be put in a given space compared to the surface area of filter media in the same space provided by tubular bag filters. Therefore, the housing enclosing the pleated cylindrically shaped filters can be smaller than a baghouse device enclosing filter bags of the same filter media area.

Many factors must be considered in designing a filter. In addition to the desirability of having as much area of filter media in a given volume as possible, it is also important to maintain a uniform velocity of gas across the filter media; to maintain a uniform gas velocity over the face of the filter, and to maintain a uniform pressure drop across the filter over the face of the filter.

The baghouse filter devices and houses employing pleated cylindrical filters known to me do not satisfy the additional factors mentioned above concerning uniform gas velocities and pressure drops.

Therefore, there is a need for a filter device having a reverse flushing feature which satisfies these additions factors.

Furthermore, the known filter devices mentioned above employing reverse flushing means for cleaning the filter media typically require directing a jet stream of high energy cleaning gas, such as air, into each filter bag or pleated cylindrical filter. In order to effectively carry out the reverse flushing function venturi nozzles are usually located at the open end clean gas outlet of each filter bag or pleated cylindrical filter for accelerating and distributing the high energy jet stream. This translates into a proliferation of venturi nozzles, at least one for each filter bag or cylindrical filter. These venturi nozzles and their necessary mounting hardware, adds to the cost of manufacturing and maintaining the equipment.

Therefore, a need exists for a filter device having a reverse flushing means which minimizes the need for a large number of venturi nozzles.

Still further, in the known filter devices mentioned above, each filter bag or pleated cylindrical filter is attached to an aperatured plate which divides the filter house into a clean gas chamber and a dirty gas chamber. Each filter bag or pleated cylindrical filter is open at its open end to a different one of the apertures in the aperatured plate to establish gas flow communication between the clean gas plenum and the downstream or clean air side of the filter bag or cylindrical filter. Necessarily, seals must be used at the attachment of each filter bag or cylindrical filter to the apertured plate to prevent leakage of dirty gas into the clean gas chamber between the interface of the filter element and apertured plate. All seals eventually deteriorate and fail, therefore, each area that must be sealed represents a source of potential leakage. Thus, the requirement for a seal at each filter element to apertured plate connection means not only a manufacturing expense, but also an expense in maintenance.

Therefore, a need exists for a filter device having a reverse flushing means which minimizes the number of seals needed to prevent dirty gas from by-passing the filter element.

SUMMARY OF THE INVENTION

The present invention not only recognizes these factors and short comings of the prior art but provides a filter device which satisfies the above mentioned factors and solves the short comings of the prior art in a simple, straightforward and relatively inexpensive manner.

More particularly, the present invention is a filter device for removing particulates from a dirty gas stream, comprising: a housing; a horizontally disposed gas impervious partition in the housing dividing the housing interior into an upper phenum chamber and a lower plenum chamber; the housing having dirty gas inlet means providing ingress for a dirty gas stream into the lower plenum chamber; the housing having cleaned gas outlet means providing egress for a cleaned gas stream from the upper plenum chamber; pleated panel filters oriented in a V-shaped bank disposed beneath the horizontal partition in the lower plenum chamber and cooperating with the horizontal partition of define a cleaned gas compartment the horizontal partition being formed with at least one aperture open to the upper plenum chamber and the cleaned gas compartment; first venturi means communicating with the aperture in the horizontal partition for producing a flow path for gases between the upper plenum chamber and the cleaned gas compartment; a second venturi disposed in the upper plenum chamber in coaxial alignment with the first venturi and spaced in an axial direction from the first venturi; and high energy cleaning gas jet emitting means spaced from the second venturi to the opposite end of the second venturi from that end thereof which is adjacent the first venturi, and disposed to direct a high energy cleaning gas jet axially into the second venturi for pressurizing the cleaned gas compartment to reverse flush clean the panel filters of separated particulates.

DETAILED DESCRIPTION OF THE PREFERRED EMBODIMENT

A better understanding of the present invention will be achieved upon reference to the accompanying specification and by reference to the drawings wherein like numerals refer to like parts throughout, and in which:

FIG. 1 is a cross-sectional view of a typical prior gas separation device;

FIG. 2 is a cross-sectional view of the prior art device of FIG. 1 viewed in the direction of arrows 2—2 in FIG. 1;

FIG. 3 is an enlarged view of the portion of the prior art device of FIG. 1;

FIG. 4 is a transverse cross-sectional view of a typical prior art pleated cylindrical filter element;

FIG. 9 is an enlarged view of the venturi nozzle arrangement of the gas separation device of the present invention;

FIG. 12 is an isometric view of a component of the present invention; and

FIG. 13 is an enlarged cross-sectional end view of the component of FIG. 12.

DETAILED DESCRIPTION OF THE PREFERRED EMBODIMENT

Figure 5:
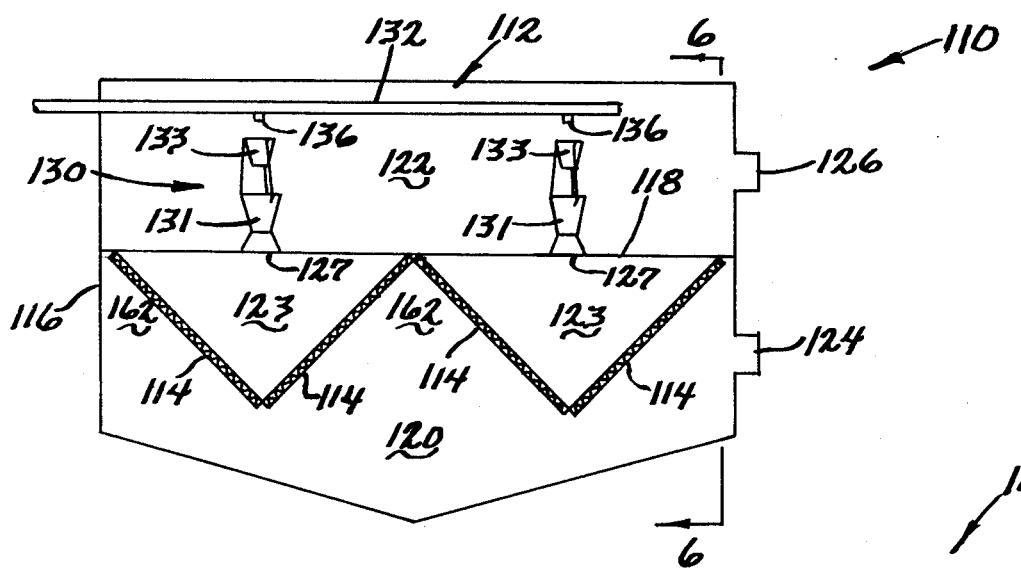
FIG. 5 is a cross-sectional view of the gas separation device of the present invention.

By way of background, reference is made to FIGS. 1 through 2 which shows a typical prior art gas separation device, generally denoted as the number 10, having pneumatic reverse flushing means, generally denoted as the numeral 12. The prior art gas separation device 10 of FIGS. 1 and 2 can be considered to depict either a baghouse using tubular filter bag filter elements, or using pleated cylindrical filter elements for the reason that both types of filter element are cylindrical in shape. The filter elements, be they filter bags or pleated cylindrical filters, are denoted in FIG. 1 as the numeral 14. The prior art device 10 comprises a filter house 16 with an apertured plate or partition 18 disposed therein dividing the house interior into a dirty gas chamber 20 and a clean gas plenum 22. The filter house 16 is formed with a dirty gas inlet 24 open to the dirty gas plenum 20 and a clean gas outlet 26 open to the clean gas plenum.

Each cylindrically shaped filter element 14 is attached at its open end 28 to the apertured partition 18 with the open end 28 in communication with a different one of the apertures in the partition 18.

The reverse flushing means 12 comprises a venturi nozzle 30 disposed in coaxial alignment with each cylindrical filter element 14 at its open end 28 and a high energy jet stream emitting apparatus generally denoted as the numeral 32, located in the clean gas plenum above the venturi nozzles 30. The jet stream emitting apparatus 32 is comprised of a manifold 34 connected to a source of high energy gas (not shown). Each branch of the manifold usually passes over the open ends 28 of a row of filter elements 14. The branches of the manifold 34 have gas emitting apertures 36, each gas emitting aperture being coaxially aligned with the open end 28 of a different one of the filter elements 14 to direct a jet stream of cleaning gas through the venturi nozzle 30 associated with that filter element 14 and into the filter element to reverse flush the filter element.

The connection of each filter element 14 to the apertured plate 18 is a potential point of leakage for dirty gas from the dirty gas plenum 20 to the clean gas plenum 22 and, therefore, require seals 38 to be used at this interface.

In addition, of course, the connection of each filter element 14 to the apertured plate 18 requires some type of attachment mechanism (not shown) for each of the filter elements so that they can be removed for replacement from time-to-time.

Now with particular reference to FIG. 1, in filtering operation, a dirty gas stream to be cleaned enters the dirty gas plenum 20 through the dirty gas inlet 24 and flows upwardly into the spaces or passages 15B between filter elements 14, thenc through the walls of the filter elements 14 whereupon a majority of the gas-borne particulates are removed, and upwardly through the open ends 28 of the filter elements 14 and the venturi nozzles 30 and into the clean gas plenum 22. The now cleaned gas exits the clean gas plenum through the clean gas outlet 26 either to the atmosphere or some down stream equipment which uses the cleaned gas or further purifies it.

Figure 7:
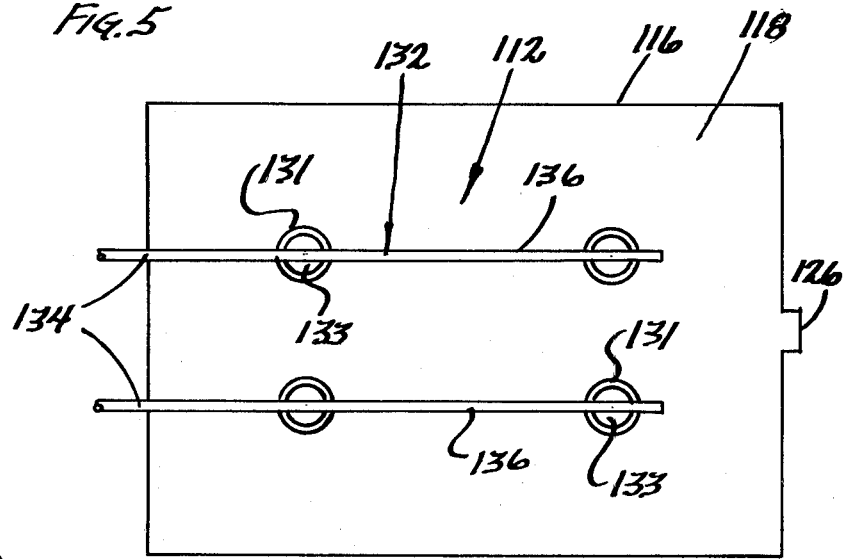
FIG. 7 is cross-sectional view of the present invention as viewed in the direction of arrows 7—7 in FIG. 6.
Figure 6:
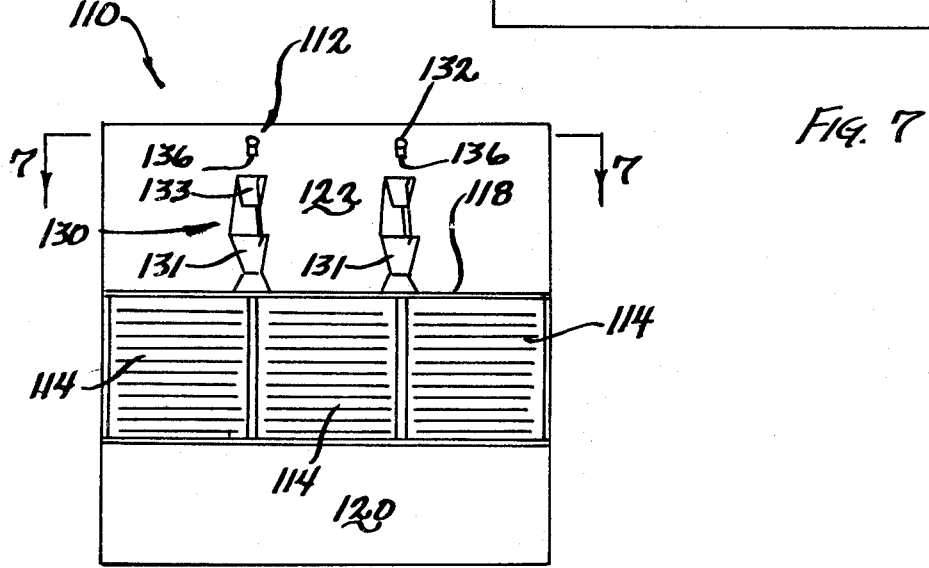
FIG. 6 is a cross-sectional view of the gas separation device of the present invention as viewed in the direction of arrows 6—6 in FIG. 5.

Referring now to FIGS. 5 through 7, the gas separation device, generally denoted as the numeral 40, of the present invention has pneumatic reverse flushing means, generally denoted as the numeral 112. Further, the gas separation device 110 comprises a filter housing 116 with a horizontally disposed partition 118 disposed therein which divides the interior of the filter house 116 into a dirty gas or lower plenum chamber 120 and a cleaned gas or upper plenum chamber 122. The housing 116 includes dirty gas inlet means 124 providing for the ingress of a dirty gas stream to be cleaned into the lower plenum chamber 120 and cleaned gas outlet means 126 providing egress for the cleaned gas stream from the upper chamber 122. A plurality of pleated panel filter elements 114 are disposed within the housing in a V-bank configuration beneath the horizontal partition 118 in the lower plenum chamber 120. The V-banked pleated panel filter configuration cooperates with the horizontal partition 118 to define a cleaned gas compartment 123. The horizontal partition 118 is formed with at least one aperture 127 open to the upper plenum chamber 122 and the cleaned gas compartment 123, thus, establishing a flow path for cleaned gas from the cleaned gas compartment 123 and upper plenum chamber 122.

The reverse flushing means 112 comprises venturi nozzle means, generally denoted as the numeral 130, disposed in coaxial alignment with each aperture 127 through the partition 118, and a high energy cleaning gas jet emitting means, generally denoted as the numeral 132, located in the upper chamber 122 above the venturi nozzle means 130. The high energy cleaning gas jet emitting means 132 is comprised of a manifold 134 connected to a source of high energy gas (not shown) such as, for example, a tank of compressed air or an air compressor. Each branch of the manifold 134 passes over at least one aperture 127 and its associated venturi nozzle means 130. The manifold branches have gas emitting apertures 136, each gas emitting aperture 136 being coaxially aligned with, and spaced substantially above a different one of the venturi nozzle means 130 to direct a jet stream of high energy cleaning gas through the venturi nozzle means 130 and into the cleaned gas compartment 123 to pressurize the cleaned gas compartment 123 and thereby reverse flush clean the pleated panel filters of separated particulates.

Now with reference to FIGS. 5 and 6, in filtering operation, a dirty gas stream to be cleaned enters the dirty gas or lower plenum chamber 120 through the dirty gas inlet 124 and flows generally upward to the pleated panel filters 114, thence through the filters 114 whereupon a majority of the gas-borne particulates are removed, and into the cleaned gas compartment 123. The now cleaned gas flows from the cleaned gas compartment 123 through the apertures 127 in the partition 118 and venturi nozzle means 130 into the cleaned gas or upper plenum chamber 122. The cleaned gas exits the upper plenum chamber 122 through the clean gas outlet 126 either to the atmosphere or some down stream equipment which uses the cleaned gas or further purifies it.

With reference to FIGS. 5,8, and 11, 12 and 13, the pleated panel filters 114 are supported in the V-shaped configuration immediately below the partition 118 by a V-shaped open work filter support structure which is suspended from the partition 118. This open work structure comprises two spaced apart V-shaped end walls 139 connected together by elongated longitudinal structural members 140 extending therebetween. The longitudinal structural members 140 can be connected at their ends to the end walls 139 by, for example, welding. In addition, other elongated structural members 141 can be disposed at right angles to the longitudinal members 140 and attached to the longitudinal members at their points of intersection to define a plurality of general rectangular flow through openings. The number of elongated members 141 used, if any, will depend upon the number and size of pleated panel filters 114 used.

Each of the top most longitudinal members 140, i.e., the two longitudinal members 140 constituting the free longitudinal edges of the V-shaped support structure, are formed with a hook shaped flange 142 extending the entire length of the longitudinal member 140.

As can be best seen in FIG. 13, the open work filter support structure is removably attached to the partition 118 by means of a pair of elongated parallel spaced apart rails 144, each rail 144 has a generally U-shaped transverse cross-sectional shape. Each rail 144 is bolted to the partition with the opening into the U-shaped facing the partition. The hook shaped flange 142 of each top most longitudinal member 140 is received in a different one of the U-shaped rails and is captured between the free end of one leg of the U-shaped rail 144 and the partition 118, thus, holding the filter support structure in place suspended from the partition 18. A gasket 146 is disposed at the interface of the V-shaped open work filter support structure and the partition 118 to prevent gas leaks therethrough.

The pleated panel filters 114 are disposed across the rectangular flow through openings defined by the intersecting longitudinal members 140 and elongated members 141 of the filter support structure, and are seated there against. Filter clamping means 148 in the form of a wedge structure are used to hold the pleated panel filters 114 in position against inadvertent movement. The included angle of the wedge structure is the same as the included angle of the V-shaped open work filter support structure. In addition, the wedge shaped filter clamp 148 is sized to fit tightly between the opposing pleated panel filters 114 in the V-shape banks supported by the open work filter support structure to force them tightly against the open work filter support structure. The wedge shaped filter clamp 148 can be, for example, constructed of two converging elongated structural members 150 tied together by other elongated structural members 152 generally transverse to and intersecting the converging members 152 to form a structure somewhat resembling a crutch. The structural members 150 and 152 can be attached together by, for example, welds at their points of mutual intersetion.

As can be best seen in FIG. 9, the venturi nozzle means 130 of the reverse flushing means 130 comprises a first venturi 131 disposed in the cleaned gas or upper plenum 122, coaxially aligned with each aperture 127 in the partition 118 and attached to the partition 118, and a second venturi 133 disposed in the upper plenum 122 in coaxial with the first venturi 131 and spaced a substantial distance in the axial direction from the first venturi 131 thereby creating a large space 135 between them. Further, the second venturi 133 is coaxially aligned with and spaced a substantial distance in the axial direction below the gas emitting aperture 136 of the high energy cleaning gas jet emitting means 132 thereby creating a large space 137 between them.

In operation, a jet stream of high energy gas is emitted from the emitting means 132 axially into the second venturi 133 across the space 137 causing a secondary gas to be aspirated from the ambient into the second venturi 133 through the space 137 adding to the volume of cleaning gas passing through the second venturi to the first venturi. The combined flow of high energy gas from the emitting means 132 and asperated secondary gas from the second venturi 137 flows axially to the first venturi 131 across the space 135 causing a tertiary gas to be aspirated from the ambient into the first venturi 131 through the space 135 adding to the volume of cleaning gas passing from the second venturi 133 into the clean gas compartment 123.

In practice it has been found that by spacing the ventures apart in the axial direction of the venturi, as opposed to, for example, disposing the venturies one within the other in a nested configuration or orienting one venturi immediately above the other with vertually no spacing between them in the axial direction, that a greater volume rate of flow of gas is aspirated into the venturis at a given high energy clean gas jet stream velocity and at a given air pressure differential between the surroundings outside of the housing 116, which is the source of aspirated air, and interior of the housing 116.

Preferrably, the first venturi 131 is larger in all dimensions than the second venturi 133. For example, a first venturi 131 having an axial overall length of 14 inches, an open cleaning gas receiving end of 8½ inches in diameter and a throat of 6 inches in diameter, and a second venturi 133 having an axial overall length of 6 inches, an open cleaning gas jet receiving end of 4 inches in diameter and a throat of 2 inches in diameter have proved to work well in practice. In addition, a 5 inch distance measured in the axial direction of the venturi for the space 135 and a 3 inch distance measured in the axial direction of the venturis for the space 137 works well in practice.

Tests conducted varying the axial dimensions of the space 135 and space 137 indicate than an axial dimension for space 135 of approximately 0.6 first venturi cleaning gas inlet diameters and an axial dimension for space 137 of approximately 0.75 second venturi cleaning gas inlet diameters works well.

Referring to the specific structure depicted in the FIG. 9, the first venturi 131 is attached at one of its ends to the partition by means of, for example, rivets 154. It should be specifically noted that no gasket or seal is used or needed at the interface of the first venturi 131 and partition 118.

The second venturi 133 is held in place above the first venturi 131 by means of three elongated support brackets 156 equally spaced around the venturis. Each elongated support bracket 156 is attached at one of its ends to the first venturi 131 and at its opposite end to the second venturi 133. The attachment can be made by any conventional or otherwise convenient means such as, for example, rivets.

Figure 8:
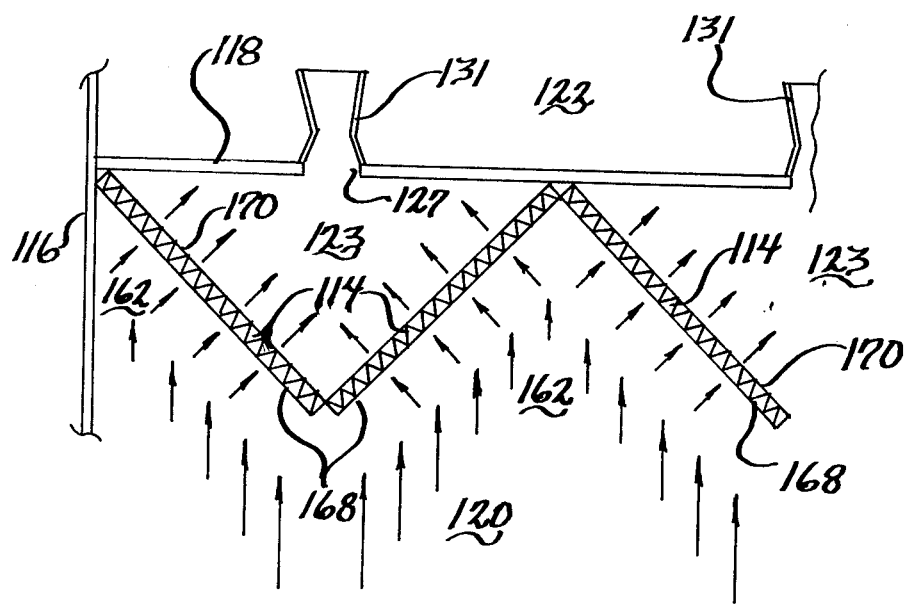
FIG. 8 is an enlarged view of the portion of the gas separation device of the present invention.
Figure 11:
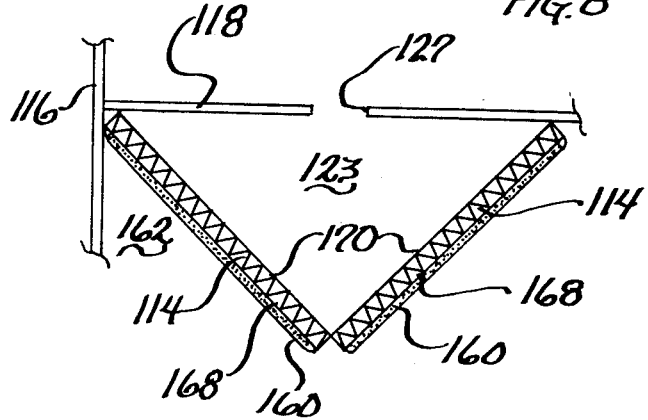
FIG. 11 is an enlarged view of a portion of the present invention of FIG. 5.
Figure 10:
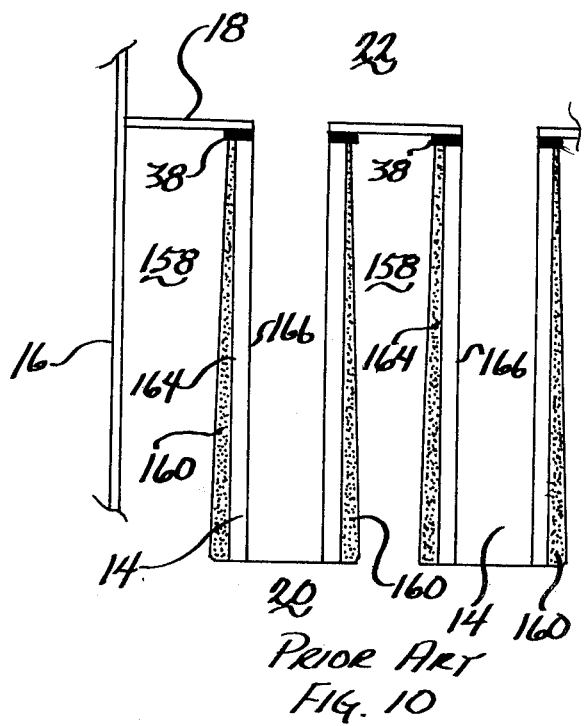
FIG. 10 is an enlarged view of a portion of the prior art device of FIG. 1.

For the following discussion attention is directed to FIGS. 3, 4, and 10 illustrating the prior art pleated cylindrical filter element 14 and to FIGS. 8 and 10 illustrating the pleated panel filter 114 of the present invention. FIG. 3 represents by vector arrows the volume rate of flow of dirty gas as it flows to the cylindrical filter. The dirty gas must flow into a dead end passage 158 defined between adjacently disposed cylindrical filter elements and the partition 118, and between cylindrical filter elements, the walls of the housing 16 and the partition 18. Initially, when the cylindrical filter 14 is clean, the volume of dirty gas flowing along the dead end passage 158 progressly diminishes from the opening into the passage toward the partition 18. This is because most of the dirty gas will first flow through the clean cylindrical filter element 14 well upstream of the partition 18. As a result, because the cross-sectional area of the passage 158 is constant over its length the velocity of the dirty gas flowing in the passage 158 will decrease as the dirty gas flows toward the partition 18. The rate of particulate matter separation from a gas stream is directly proportional to the velocity of the gas flowing through the filter element. Therefore, separated particulate matter will build-up faster on that portion of the cylindrical filter element 14 proximate the upstream end of the passage 158 than on the cylindrical filter element 14 further downstream. This condition is illustrated in FIG. 10 where the build-up is illustrated generally as the numeral 160. As the separation device continues to operate and separated particulate build-up has accumulated on the portions of the cylindrical filter element 14 proximate the upstream portion of the passage 158 resistance to gas flow in this area will increase. The causes a greater volume of dirty gas to flow further downstream in the passage 158 to a portion of the cylindrical wall having less separated particulate build-up, i.e., less resistance to the passage therethrough of dirty gas. Thus, the build-up of separated particles on the cylindrical filter elements will progress in a downstream direction toward the partition and will not be uniform at any given time.

FIG. 8 represents by vector arrows the volume rate of flow of dirty gas as it flows to the pleated panel filter 114. The dirty gas flows into a wedge shaped passage 162 defined between adjacently disposed panel filters 114 and between a panel filter 114 and the wall of the housing 116. The volume rate of flow of dirty gas will, of course, diminish as the dirty gas stream progresses into the passage 162, however, because the cross-sectional area of the passage 162 also decrease, the velocity of the dirty gas stream will be vertually constant as it flows in the passage 162. Thus, because the rate of separated build-up on the filter is directly proportional to the velocity of the gas flowing through the filter element, the separated particulate build-up 160 will be relatively uniform over the face of the panel filter 114 as denoted by the numeral 160 in FIG. 11.

An eveness of build-up of separated particulate on a filter has an effect upon the pressure drop over the surface or face of the filter which in turn effects dust separation efficiency and filter life. The more even this build-up the more uniform will be the pressure drop across the filter over the entire surface of the filter which will result in a longer filter life and higher dust separation efficiency measured over the life of the filter.

Now with reference to FIGS. 4 and 8, the gas flow velocity through the pleated cylindrical filter element 14 at a constant volume rate of flow, will increase because the area of the upstream side 164 of the cylindrical filter 14 is larger than the area of its downstream side 166. However, the gas flow velocity through or across the pleated panel filter 114 will remain constant because the area of the upstream side 168 of the panel filter 114 is the same as the area of its downstream side 170. By the same token, the resistance to gas flow through the pleated cylindrical filter 14 will be greater than through the pleated panel filter 14.

The foregoing detailed description is given primarily for clearness of understanding and no unnecessary limitations should be understood therefrom for modifications will be obvious to those skilled in the art upon reading this disclosure and can be made without departing from the spirit of the invention or the scope of the appended claims.

I claim:

1. A filter device for removing particulates from a dirty gas stream, comprising:

a housing;

a horizontally disposed gas impervious partition in the housing dividing the housing interior into an upper plenum chamber and a lower plenum chamber, said partition having an aperture providing fluid communication between the upper and lower plenum chambers;

dirty gas inlet means in said housing providing ingress for a dirty gas stream into the lower plenum chamber;

cleaned gas outlet means in said housing providing egress for a cleaned gas stream from the upper plenum chamber;

a filter supporting structure of generally V-shaped cross-sectional configuration secured to said partition;

said supporting structure having opposing open side walls opening into the lower gas plenum and an upper opening opening into the upper plenum chamber through the aperture in said partition;

a plurality of adjacent panel filters nestled within the supporting structure across each of the open sides of the supporting structure to form a generally V-shaped filter bank providing a filter barrier between the upper and lower plenum chambers;

filter retaining means nestled within the filter bank and generally contiguously engaging each of the filter panels to secure the panels to the supporting structure in dust-tight sealing relation;

a first venturi nozzle communicating with the aperture in the horizontal partition for providing a flow path for gases between the upper plenum chamber and the cleaned gas compartment;

a second converging nozzle disposed in the upper plenum chamber in coaxial alignment with the first venturi and spaced in an axial direction from the first venturi thereby creating a space between them; and, high energy cleaning gas emitting means spaced above the second converging nozzle adapted to direct a high energy cleaning gas jet axially into the second converging nozzle for pressurizing the cleaned gas compartment to reverse flush clean the panel filters of separated particulates.

2. The filter device according to claim 1, and each of said side walls having an outwardly projecting marginal edge portion; and clamping means releasably securing said marginal edge portions to said partition.

3. The filter device of claim 1, wherein the first venturi has a larger diameter than the second converging nozzle.

4. The filter device of claim 3, wherein that end of the first venturi which is adjacent the second converging nozzle is larger in diameter than the adjacent open end of the second converging nozzle.

5. The filter device of claim 4, wherein the V-shaped bank of panel filters is disposed immediately below the horizontal partition in the cleaned gas compartment.

6. The filter device of claim 5, wherein the V-shaped bank of panel filters converge in a direction downwardly from the horizontal partition into the lower plenum chamber.

7. The filter device of claim 6, wherein the panel filters are removable.

8. The filter device of claim 1, wherein the axial distance by which the second converging nozzle is spaced from the first venturi is approximately 0.6 first venturi cleaning gas inlet diameters and the axial distance by which the second converging nozzle is spaced from the high energy cleaning gas emitting means is approximately 0.75 second converging nozzle cleaning gas inlet diameters.

* * * * *